US012151350B2

(12) United States Patent
Nagao et al.

(10) Patent No.: US 12,151,350 B2
(45) Date of Patent: Nov. 26, 2024

(54) DRIVING TOOL

(71) Applicant: MAKITA CORPORATION, Anjo (JP)

(72) Inventors: Masaya Nagao, Anjo (JP); Norikazu Baba, Anjo (JP); Shun Kuriki, Anjo (JP); Kazusa Fukuda, Anjo (JP)

(73) Assignee: MAKITA CORPORATION, Anjo (JP)

( * ) Notice: Subject to any disclaimer, the term of this patent is extended or adjusted under 35 U.S.C. 154(b) by 0 days.

(21) Appl. No.: 18/304,410

(22) Filed: Apr. 21, 2023

(65) Prior Publication Data

US 2023/0364763 A1 Nov. 16, 2023

(30) Foreign Application Priority Data

May 13, 2022 (JP) ................................ 2022-079286
Mar. 17, 2023 (JP) ................................ 2023-043044

(51) Int. Cl.
*B25C 1/04* (2006.01)
*B25C 1/06* (2006.01)

(52) U.S. Cl.
CPC ................ *B25C 1/047* (2013.01); *B25C 1/06* (2013.01)

(58) Field of Classification Search
CPC .. B25C 1/04; B25C 1/06; B25C 1/047; B25C 1/041
USPC ... 173/217, 48, 162.2, 162.1, 170, 216, 178, 173/201, 176
See application file for complete search history.

(56) References Cited

U.S. PATENT DOCUMENTS

2021/0197350 A1* 7/2021 Umino ...................... B25C 1/06

FOREIGN PATENT DOCUMENTS

JP 6627990 B2 1/2020

* cited by examiner

*Primary Examiner* — Jacob A Smith
(74) *Attorney, Agent, or Firm* — Oliff PLC

(57) ABSTRACT

An elastic member is disposed between an internal gear of a gear train and a gear housing. A force is applied to the gear train when a lift mechanism is activated. The force is received and absorbed by the elastic member, thereby reducing the amount of force received by the gear housing.

20 Claims, 11 Drawing Sheets

DRIVING TOOL

CROSS-REFERENCE

This application claims priority to Japanese patent application serial number 2022-079286, filed on May 13, 2022, and to Japanese patent application serial number 2023-043044, filed on Mar. 17, 2023, the entire contents of all of which are incorporated herein by reference in their entirety for all purposes.

TECHNICAL FIELD

The present disclosure generally relates to a driving tool for driving a material, such as a nail or a staple, into a workpiece, such as, for example, a wooden material.

BACKGROUND ART

For example, a gas-spring type driving tool that utilizes a thrust power of compressed air as a driving force is known. The gas-spring type driving tool may include a piston that moves in an up-down direction within a cylinder and a driver that is connected to the piston. The driver may move integrally with the piston in the up-down direction and drive a driving member. The piston and the driver may move downward in a driving direction owing to a pressure of the gas filled in an accumulation chamber.

The piston and the driver may return in a direction opposite to the driving direction by use of a lift mechanism that is arranged on a lateral side of a driving nose. The lift mechanism may include a wheel that engages the driver. The wheel may be housed in a wheel housing that is integrally formed with the driving nose. The wheel may be rotated by an electric motor. A rotation output of the electric motor may be transmitted to the wheel via a planetary gear device. A gear housing that houses the planetary gear device may be connected to the wheel housing. The driver may return in a direction opposite to the driving direction by rotation of the wheel. A pressure of a gas filled in an accumulation chamber may be applied to the driver. For example, a structure may strengthen the durability (longevity) of the gear housing with respect to a force (gas pressure indirectly applied to the gear housing) applied to the gear housing via the planetary gear device when the driver is being returned.

For example, an elastic member may held in an engaging portion. The engaging portion is provided between a wheel housing and a gear housing, both of which are arranged around a motor axis. This configuration may make it difficult to design a planetary gear device in a compact fashion in the motor axis direction. Thus, there is a need for a driving tool in which a gear device can be made compact and in which the longevity of the gear housing is enhanced.

SUMMARY

According to one feature of the present disclosure, a driving tool comprises a piston configured to move in a driving direction owing to a pressure of a gas, and a driver configured to drive a driving member by moving integrally with the piston in the driving direction. The driving tool also comprises a wheel configured to move the driver in a direction opposite to the driving direction, and an electric motor configured to rotate the wheel by rotation of the electric motor, thereby moving the driver in the direction opposite the driving direction. The driving tool also comprises a planetary gear device configured to reduce a rotation output (e.g., speed) of the electric motor, thereby outputting a reduced rotation output (e.g., a reduced speed) to the wheel. A gear housing configured to house the planetary gear device. Also, the driving tool comprises an elastic member disposed between an internal gear and the gear housing. The elastic member is configured to receive a force from the internal gear, which is generated when the electric motor rotates.

Because of this configuration, when the driver moves in a direction opposite to the driving direction due to rotation of the electric motor, the force applied to the internal gear is received by the elastic member. Accordingly, the longevity of the gear housing can be improved. Furthermore, a size of the planetary gear device in a direction along a center axis of the planetary gear device (motor axis direction) can be reduced, in part because the elastic member is disposed between the internal gear of the planetary gear device and the gear housing.

DETAILED DESCRIPTION

Figure 1:
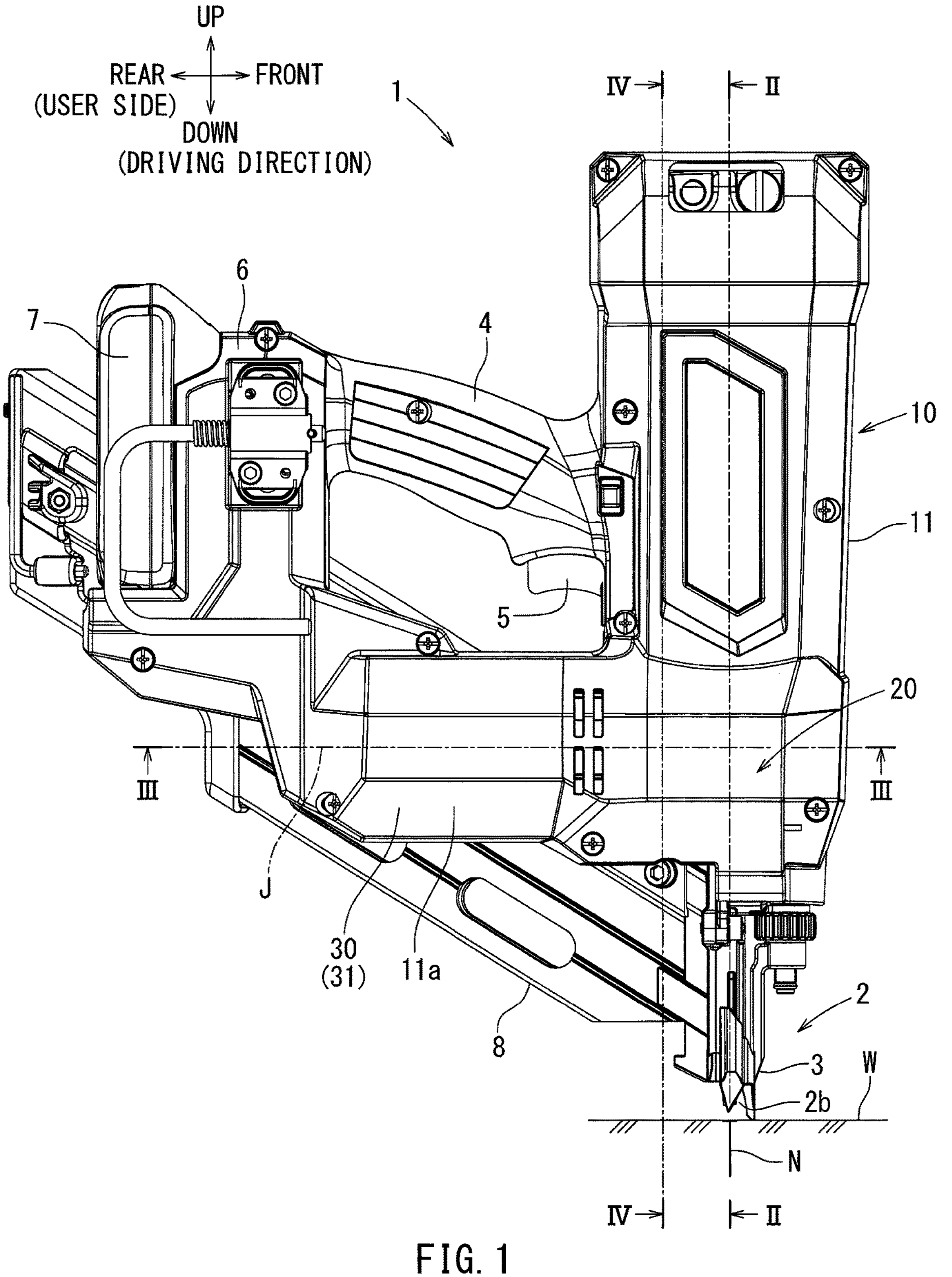
FIG. 1 is an overall right side view of a driving tool according to a first embodiment of the present disclosure.

The detailed description set forth below, when considered with the appended drawings, is intended to be a description of exemplary embodiments of the present disclosure and is not intended to be restrictive and/or to represent the only embodiments in which the present disclosure can be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the disclosure. It will be apparent to those skilled in the art that the exemplary embodiments of the disclosure may be practiced without these specific details. In some instances, these specific details refer to well-known structures, components, and/or devices that are shown in block diagram form in order to avoid obscuring significant aspects of the exemplary embodiments presented herein.

According to a feature of the present disclosure, for example, the planetary gear device includes a plurality of gear train stages arranged in series. The elastic member is disposed, for example, between the internal gear (an embodiment of which is a ring gear) and the gear housing of a last gear train stage. Because of this configuration, the force applied to the gear housing from the last internal gear can be absorbed by the elastic member, thereby increasing the longevity of the gear housing.

According to another feature of the present disclosure, for example, the internal gear includes a plurality of outer periphery projections extending radially outward from an outer peripheral surface of the internal gear. For example, the gear housing also includes a plurality of inner periphery projections extending radially inward from an inner peripheral surface of the gear housing. For example, each of the elastic members is disposed between an outer periphery projection and a corresponding inner periphery projection. Accordingly, the elastic members receive the force applied to the internal gear in a rotation direction via the outer periphery projections when the driver moves in the direction opposite to the driving direction. Because of this configuration, the force around a center axis of the internal gear can be more reliably absorbed by the electric member.

According to another feature of the present disclosure, for example, each of the outer periphery projections includes an elastic member receiving surface that contacts the elastic member. For example, the elastic member receiving surface may extend in a direction approximately perpendicular to a tangential plane of an outer peripheral surface of the internal gear. Because of this configuration, the force around the center axis of the internal gear can be applied to the elastic member in an efficient manner. Accordingly, the force can be efficiently absorbed by the elastic member. Also, the elastic member can be prevented from being displaced in a radial direction of the internal gear.

According to another feature of the present disclosure, for example, the elastic member is made of a rubber. For example, the elastic member includes a groove on a surface of the elastic member. Because of the presence of the groove, the elastic member can be more easily elastically deformed. Accordingly, the elastic member can be formed in a more compact size in a radial direction of the internal gear. Also, the force can be more efficiently absorbed by the elastic member due to its elastic deformation.

According to another feature of the present disclosure, for example, the elastic member has six plane faces. For example, the elastic member includes a groove that is configured to extend in a direction parallel to a center axis of the internal gear and includes a groove that is configured to extend in a direction perpendicular to the center axis of the internal gear, the directions being in reference to when the elastic member is disposed between the internal gear and the gear housing. Because of this configuration, a groove having a cross shape is formed on a surface of the elastic member. Accordingly, the elastic member can be formed in a compact size in a radial direction of the internal gear. Also, the force can be efficiently absorbed by the elastic member due to its elastic deformation.

According to another feature of the present disclosure, for example, the gear housing includes a first housing made of resin and the second housing made of metal. The first housing and the second housing may be connected to each other along a center axis of the internal gear. For example, the second housing may be structured to house the internal gear of the last gear train stage. Because of this configuration, the force, which is eventually applied to the second housing, can be absorbed by the elastic member. Accordingly, the longevity of the second housing, which can be made of metal, can be improved.

According to another feature of the present disclosure, for example, the second housing includes a boss portion that is inserted into an inner periphery surface of the first housing. The boss portion may be configured for connecting the second housing to the first housing. For example, the elastic member may be arranged on a same circumference as the boss portion. Because of this configuration, a size of the second housing can be made more compact in a radial direction of the second housing, while still allowing the elastic member to be disposed between the second housing and the internal gear.

According to another feature of the present disclosure, for example, the driver is configured to reciprocate in a direction perpendicular to a center axis of the internal gear. For example, the elastic member may be disposed in an area on a side of the internal gear opposite to the driver, with respect to the center axis of the internal gear. Because of this configuration, the elastic member is not disposed in an area that is on a side of the driver, thereby making the gear housing thinner in thickness. Accordingly, the gear housing of the driving nose can be made more compact in a radial direction of the gear housing, while also allowing the elastic member to be disposed in a required area for absorbing the force applied to the gear housing.

According to another feature of the present disclosure, for example, a washer that is configured to cover the internal gear and the elastic member are arranged such that the internal gear and the elastic member are prevented from being displaced in a direction along a center axis of the internal gear. Because of the presence of the washer, the internal gear and the elastic member can be prevented from being displaced in a direction parallel to the center axis of the internal gear. Accordingly, the displacement of the elastic member in the direction parallel to the center axis of the internal gear can be prevented without using separate restriction members, thereby avoiding a complicated configuration.

According to another feature of the present disclosure, for example, the planetary gear device includes a plurality of gear train stages arranged in series along a power transmission path. Each of the gear train stages include a sun gear, a plurality of planetary gears, each of which engages the sun gear, and a carrier that rotatably supports each of the plurality of planetary gears. For example, the sun gear of the gear train stage is on a downstream side of the power transmission path and is arranged at a center position of a carrier of a prior gear train stage, except for a last gear train stage, on an upstream side of the power transmission path. For example, the carrier of the gear train stage on the upstream side is connected to the sun gear of the gear train stage on the downstream side so as to be relatively movable, the carrier and the sun gear being formed of separate members. Because of this configuration, the sun gear moves with respect to the carrier (owing to an appropriate clearance) such that a self-aligning function of the sun gear with respect to the plurality of planetary gears, each of which engages the sun gear, can be obtained. Accordingly, a load with respect to the planetary gears can be reduced, thereby improving the longevity of the planetary gears.

According to another feature of the present disclosure, for example, the sun gear and the carrier, which are separate members, are spline-connected to each other. Because of this configuration, electric power of the electric motor can be efficiently transmitted to the wheel, while still obtaining the self-aligning function of the sun gear with respect to the planetary gears.

Next, a first embodiment according to the present disclosure will be described with reference to FIGS. 1 to 9. FIG. 1 shows an example of a driving tool 1. The driving tool 1 of FIG. 1 is, for example, a gas-spring type driving tool 1 that utilizes a pressure of a gas filled in a chamber above a cylinder 12 as a thrust power for driving a driving member N. In the following explanation, a driving direction of the driving member N is a downward direction, and a direction opposite to the driving direction is an upward direction. In FIG. 1, a user of the driving tool 1 may be generally situated on a rear side of the driving tool 1. The rear side of the driving tool 1 may be also referred to as a user side, and a side in a forward direction may be referred to as a front side. A left and right side may be based on a user's position when situated on the rear side of the driving tool 1.

Figure 3:
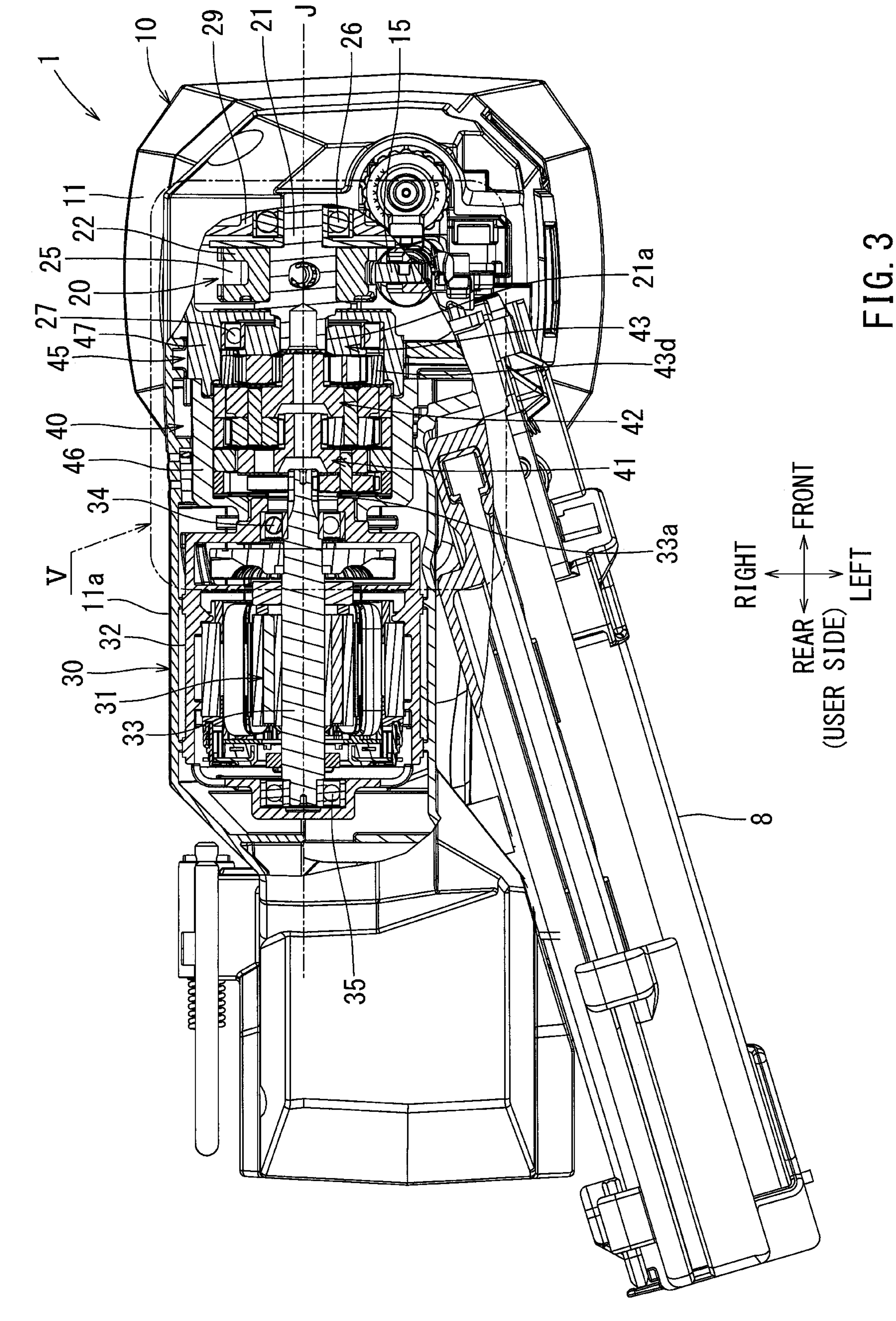
FIG. 3 is a cross-sectional view taken along line III-III of FIG. 1, showing a transversal cross-sectional view of a lift mechanism.
Figure 4:
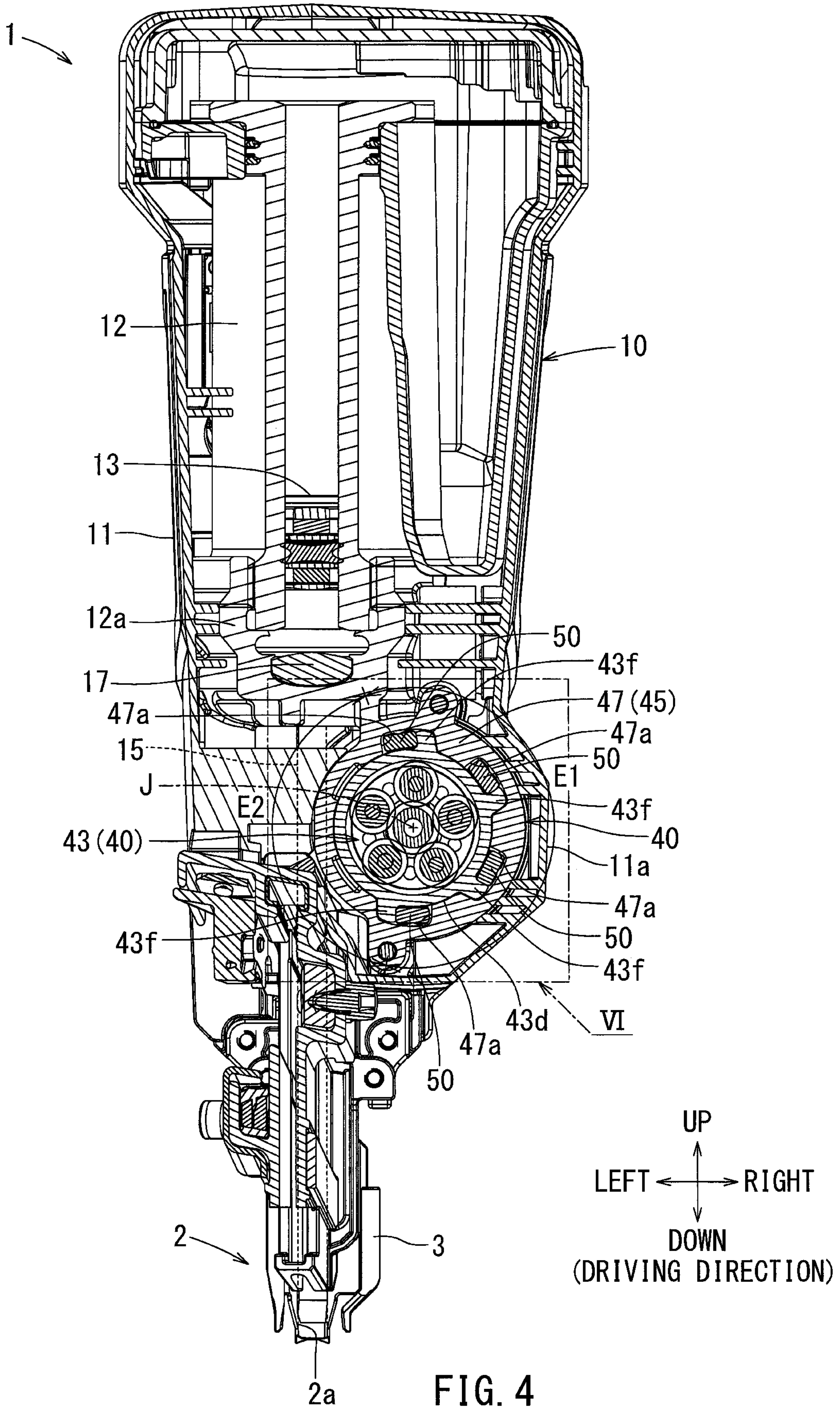
FIG. 4 is a cross-sectional view taken along line IV-IV of FIG. 1, showing a longitudinal cross-sectional view of a planetary gear device.

As shown in FIGS. 1 and 3, the driving tool 1 may include a tool main body 10. The tool main body 10 may be configured to include a cylinder 12 that is housed in a tubular main body housing 11. A piston 13 may be housed within the cylinder 12, so as to be able to be reciprocated in an up-down direction. An upper portion of the cylinder 12, which is a portion that is above the piston 13, may communicate with an accumulation chamber 14. A compressible gas such as, for example, air may be filled in the accumulation chamber 14. A pressure of the gas filled in the accumulation chamber 14 may act on an upper surface of the piston 13, thereby providing a thrust power for a driving operation.

Figure 2:
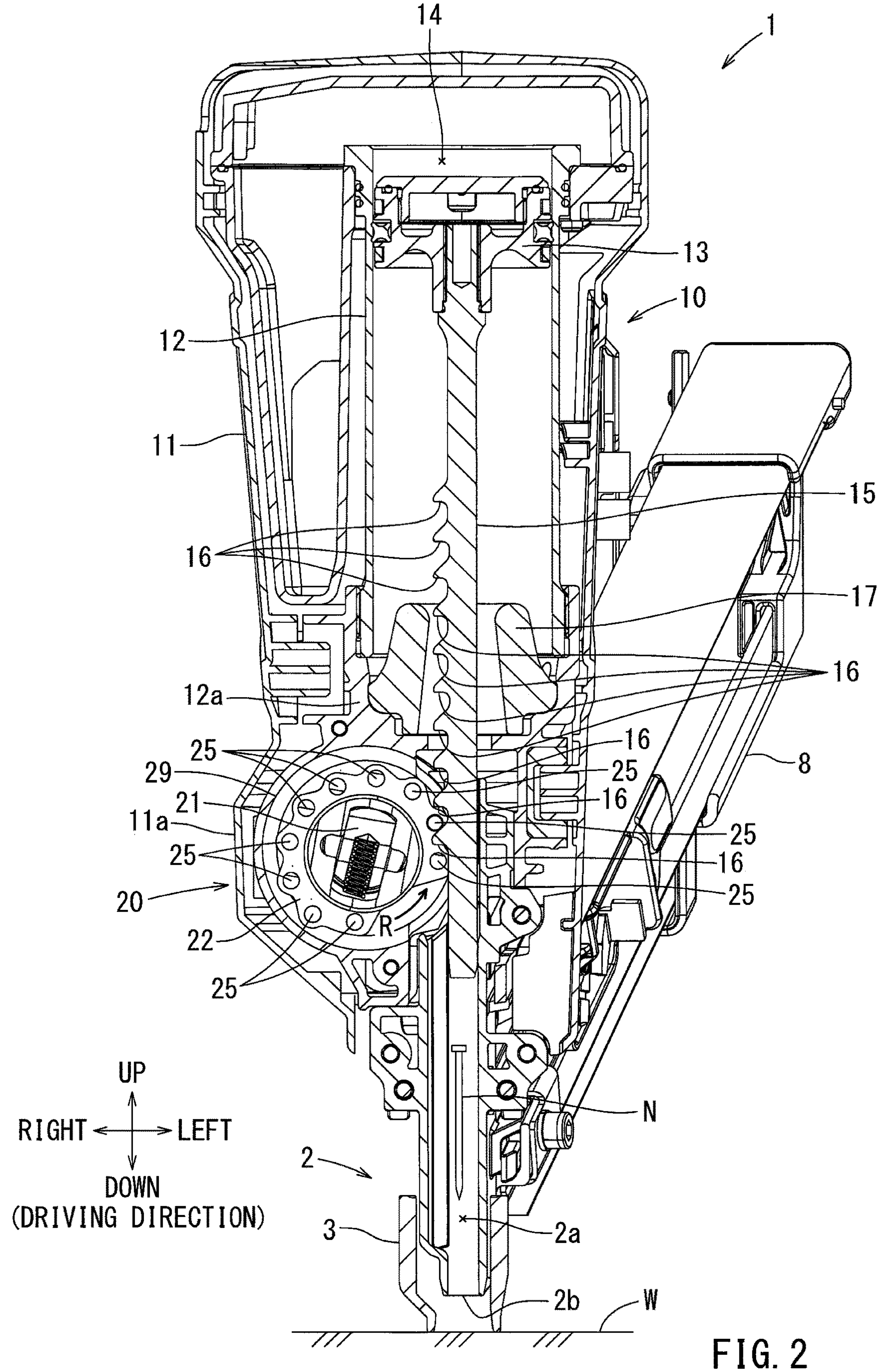
FIG. 2 is a cross-sectional view taken along line II-II of FIG. 1, showing a longitudinal cross-sectional view of a tool main body.

As shown in FIG. 2, a lower portion of the cylinder 12 may communicate with a driving passage 2*a* of a driving nose 2. The driving nose 2 is provided at a lower portion of the tool main body 10. A magazine 8, within which a plurality of driving members N can be loaded, may be linked to the driving nose 2. The plurality of driving members N may be supplied from within the magazine 8 to the driving passage 2*a* one by one. A contact arm 3 may be arranged at a lower portion of the driving nose 2. The contact arm 3 may be slidable in the up-down direction. The contact arm 3 may move upward when the contact arm 3 is pressed against a workpiece W.

As shown in FIG. 2, a driver 15 may be connected to a lower portion of the piston 13. A lower portion of the driver 15 may enter a driving passage 2*a* of the driving nose 2. The driver 15 may move downward within the driving passage 2*a* owing to the pressure of the gas filled in the accumulation chamber 14, the gas being configured to act on the upper surface of the piston 13. The lower portion of the driver 15 may drive a driving member N that has been supplied to the driving passage 2*a*. The driving member N being driven by the driver 15 may be ejected from an ejection port 2*b* of the driving nose 2. The driving member N that is ejected from the ejection port 2*b* may be driven into the workpiece W. A lower end damper 17, which is for absorbing an impact of the piston 13, may be disposed on a lower side of the cylinder 12.

As shown in FIG. 2, a plurality of engaged portions 16 may be formed on a right side of the driver 15. In a first embodiment of the present disclosure, ten engaged portions 16 may be arranged at specified intervals in a longitudinal direction of the driver 15 (up-down direction). Each of the plurality of engaged portions 16 may be formed in a rack teeth shape projecting in a direction toward the wheel 22 (toward the right direction). Each of the plurality of engaged portions 16 may engage a corresponding engaging portion 25 arranged in a lift mechanism 20, an embodiment of which is discussed later in detail.

As shown in FIG. 1, a grip 4, which is configured to be held by a user, may be arranged on a rear side of the tool main body 10. A trigger 5, which is configured to be pulled by a fingertip of the user, may be arranged on a lower surface of a front portion of the grip 4. When the contact arm 3 is pushed against the workpiece W so as to move the contact arm 3 relatively upward with respect to the driving nose 2, a pull operation of the trigger may become effective. A battery attachment portion 6 may be arranged on a rear side of the grip 4. A battery pack 7 may be detachably attached to a rear surface of the battery attachment portion 6. The battery pack 7 may be removed from the battery attachment portion 6 to be repeatedly recharged by a dedicated charger. The battery pack 7 may be used as a power source for various electric tools. The battery pack 7 may serve as a power source for supplying power to a driving unit 30, an embodiment of which is discussed later in detail.

As shown in FIG. 2, a lift mechanism 20 may be linked to a right side of the driving nose 2. The lift mechanism 20 may have a function of returning the driver 15, and accordingly the piston 13, upward after a driving operation has been completed. The pressure of the gas in the accumulation chamber 14 may increase owing to an upward movement of the piston 13 by the lift mechanism 20.

As shown in FIG. 1, the driving unit 30 for driving the lift mechanism 20 may be arranged on a rear side of the lift mechanism 20. The lift mechanism 20 and the driving unit 30 may be housed in approximately a tubular-shaped driving unit case 11*a*. The driving unit case 11*a* may link a lower portion of the main body housing 11 to a lower portion of the battery attachment portion 6. The driving unit case 11*a* may be integrally formed with the main body housing 11. The main housing 11 and the driving unit case 11*a*, which may be made of a plastic resin, may each have a half-split structure.

As shown in FIG. 2, the lift mechanism 20 may include a rotation shaft 21 and a wheel 22. The wheel 22 may be supported by the rotation shaft 21. The rotation shaft 21 may be connected to a planetary gear device 40, an embodiment of which is discussed later in detail. The wheel 22 may be housed in approximately a tubular-shaped wheel case 29. The wheel case 29 may be integrally formed in a lower case 12*a* that covers a lower portion of the cylinder 12. The lower end damper 17 may be disposed on an inner circumferential side of the lower case 12*a*.

Figure 5:
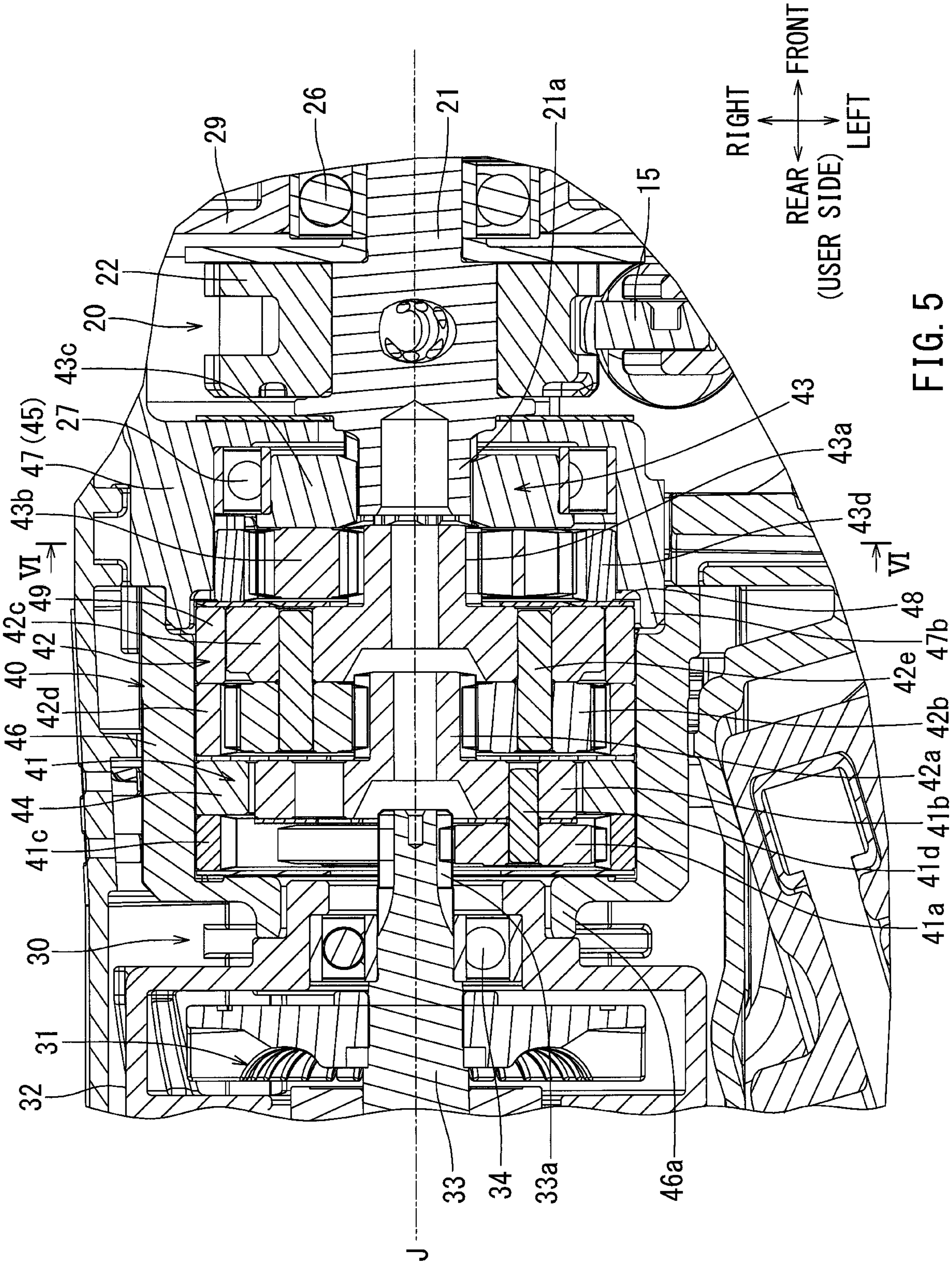
FIG. 5 is an enlarged view of a part V of FIG. 3, showing an enlarged view of the lift mechanism and the planetary gear device.

As shown in FIGS. 3 and 5, a rotation axis line of the rotation shaft 21 may be aligned with a motor axis line J. A front side portion of the rotation shaft 21 may be rotatably supported by the wheel case 29 via a bearing 26. A rear side portion of the rotation shaft 21 may be connected to a carrier of a last gear train stage of the planetary gear device 40. The carrier of the last gear train stage of the planetary gear device 40 may be rotatably supported by the wheel case 29 via a bearing 27. The bearing 27 may be disposed on an outer circumferential side of the carrier of the last gear train stage of the planetary gear device 40. When the electric motor 31 is activated (rotated), the rotation axis 21 of the lift mechanism 20 and the wheel 22 may be integrally rotated, for instance in a direction indicated by an arrow R in FIG. 2 (in a counterclockwise direction of FIG. 2).

As shown in FIG. 2, a plurality of engaging portions 25 may be arranged along an outer periphery of the wheel 22.

In the first embodiment of the present disclosure, the wheel 22 may include ten engaging portions 25, for example. A cylindrical shaft member (e.g. a pin) may be used for each of the plurality of engaging portions 25. The ten engaging portions 25 may be circumferentially arranged in an area spanning approximately three-fourths of the wheel 25. The engaging portions 25 may be absent from an area spanning approximately one-fourth of the wheel 22, which may be referred to as a recessed area.

As shown in FIG. 2, a left side portion of the wheel 22 may enter the driving passage 2*a* from within the wheel case 29. Each of the plurality of engaging portions 25 of the wheel 22 may engage a corresponding engaged portion 16 of the driver 15 within the driving passage 2*a*. By rotation of the wheel 22, for instance in a direction indicated by an arrow R, each of the plurality of engaging portions 25 of the wheel 22 may successively engage a corresponding engaged portion 16 of the driver 15. This causes the driver 15 and the piston 13 to return by moving in an upward direction.

As shown in FIG. 3, the driving unit 30 may include an electric motor 31 serving as a driving source. The electric motor 31 may be housed in a motor case 32. The motor case 32 may be retained in the driving unit case 11*a*. The electric motor 31 may be housed in the driving unit case 11*a* such that an axis line of an output shaft 33 of the electric motor 31 (motor axis line J) extends in a front-rear direction perpendicular to a driving direction (a direction perpendicular to a paper surface of FIG. 3). The battery pack 7 may serve as a power source for the electric motor 31. The electric motor 31 may be activated by a pull operation of the trigger 5 or any other suitable operation.

As shown in FIG. 3, the output shaft 33 of the electric motor 31 may be rotatably supported by the motor case 32 via a front bearing 34 and a rear bearing 35. A front portion of the output shaft 33, which may extend from the front portion of the motor case 32, may be connected to the planetary gear device 40. A driving gear 33*a* may be arranged at a front portion of the output shaft 33.

As shown in FIG. 3, the planetary gear device 40 may be housed in approximately a tubular-shaped gear housing 45. The planetary gear device 40 may include a gear train with three planetary gear train stages, which may include a first gear train stage 41, a second gear train stage 42, and a third gear train stage 43. The first gear train stage 41, the second gear train stage 42, and the third gear train stage 43 may be coaxial arranged relative to each other, and may also be arranged to be coaxial with the motor axis line J. A rotation output of the electric motor 31 may be output to the lift mechanism 20 after having its speed reduced by the planetary gear device 40, which includes the three planetary gear trains, having the first gear train stage 41, the second gear train stage 42, and the third gear train stage 43, in this embodiment.

As shown in FIG. 5, the gear housing 45 may include a first housing 46 and a second housing 47. The first housing 46 may be made of a plastic resin and the second housing 47 may be made of metal. The first housing 46 and the second housing 47 may be connected to each other and may be positioned along the motor axis line J. The first gear train stage 41 and the second gear train stage 42 may be housed in the first housing 46, which may be made of resin. A rear portion 46*a* of the first housing 46 may be connected to a front portion of the motor case 32.

As shown in FIG. 5, the third gear train stage 43 may be housed in the second housing 47, which may be made of metal. The second housing 47 may be integrally formed with the wheel case 29. Because of this configuration, the lower case 12*a*, the wheel case 29, and the second housing 47 may be integrally formed in the first embodiment of the present disclosure. In the first embodiment, the lower case 12*a*, the wheel case 29, and the second housing 47 may be integrally formed of die cast aluminum.

Referring to FIG. 5, the first gear train stage 41 may include three planetary gears 41*a*, one carrier 41*b*, and one internal gear 41*c*. Each of the three planetary gears 41*a* may engage the driving gear 33*a* of the electric motor 31. The driving gear 33*a* may correspond to a sun gear of the first gear train stage 41. The internal gear 41*c* may be fixed to an inner surface of the first housing 46. All three planetary gears 41*a* may engage the internal gear 41*c*. Further, each of the three planetary gears 41*a* may be rotatably supported by the carrier 41*b* via a corresponding support shaft 41*d*.

Referring to FIG. 5, a sun gear 42*a* of the second gear train stage 42 may be integrally formed with the carrier 41*b* of the first gear train stage 41. The sun gear 42*a* of the second gear train stage 42 may be located at a front portion of the carrier 41*b* of the first gear train stage 41. Though not shown in the figures, a one-way clutch may be disposed between the first gear train stage 41 and the second gear train stage 42. The one-way clutch may prevent the planetary gear device 40 from reversely rotating (e.g., preventing the wheel 22 from rotating in a direction opposite to the direction indicated by an arrow R in FIG. 2).

Referring to FIG. 5, the second gear train stage 42 may include the sun gear 42*a*, three planetary gears 42*b*, one carrier 42*c*, and one internal gear 42*d*. Each of the three planetary gears 42*b* of the second gear train stage 42 may engage the sun gear 42*a*. All three planetary gears 42*b* may engage the internal gear 42*d*. The internal gear 42*d* may be fixed to the inner surface of the first housing 46. A circular ring-shaped interposing member 44 may be disposed between the internal gear 41*c* of the first gear train stage 41 and the internal gear 42*d* of the second gear train stage 42. Because of the presence of the interposing member 44, the internal gear 41*c* of the first gear train stage 41 and the internal gear 42*d* of the second gear train stage 42 may be prevented from being displaced in a direction along or parallel to the motor axis line J.

Figure 6:
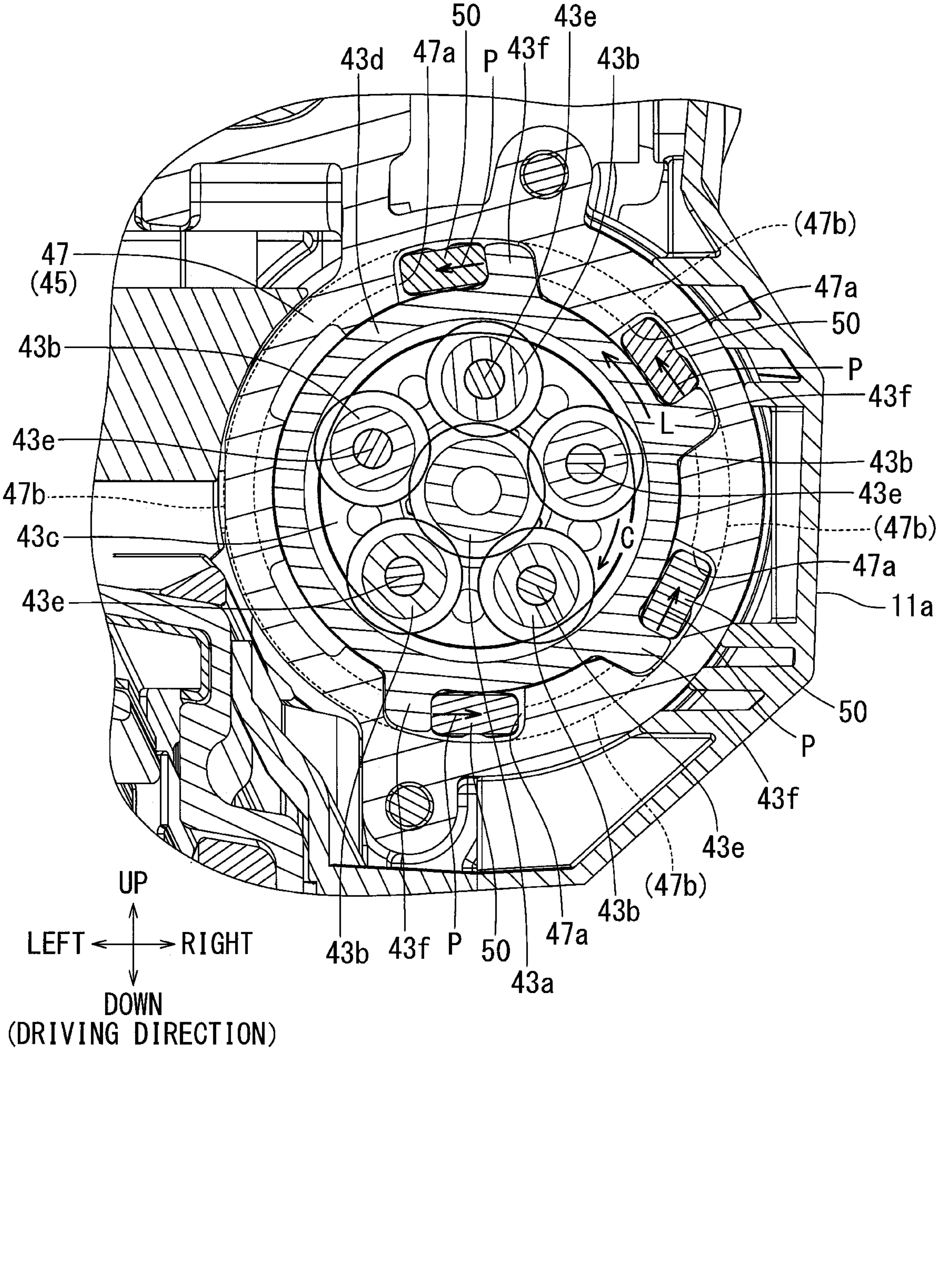
FIG. 6 is an enlarged view of a part VI of FIG. 4, showing an enlarged view of the planetary gear device. This figure corresponds to a cross-sectional view taken along line VI-VI of FIG. 5
Figure 7:
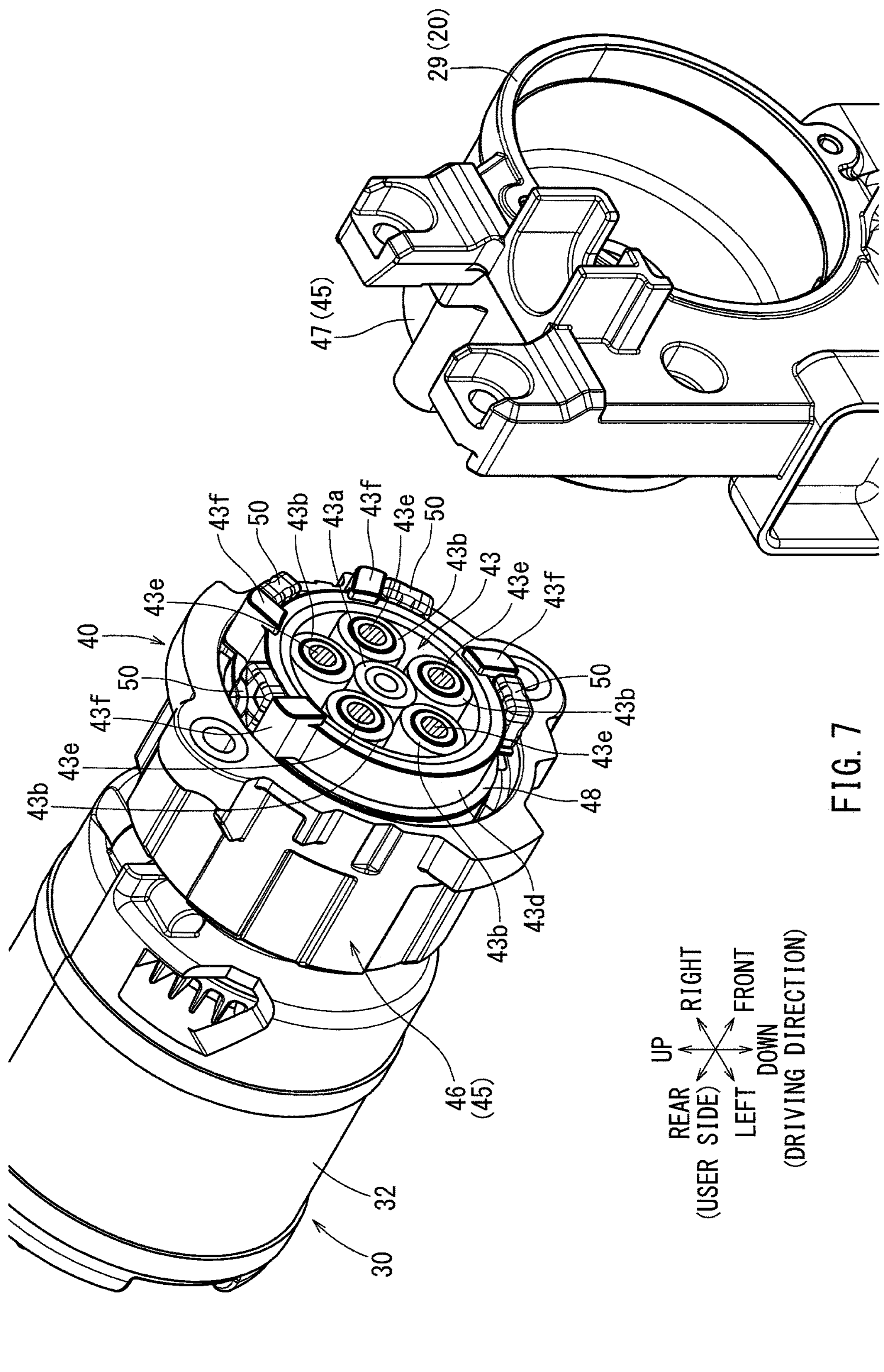
FIG. 7 is a perspective view of a third gear train stage (a third stage of the planetary gear device).

Referring to FIG. 5, a sun gear 43*a* of the third gear train stage 43 may be integrally formed with the carrier 42*c* of the second gear train stage 42. The sun gear 43*a* of the third gear train stage 43 may be positioned at a front portion of the carrier 42*c* of the second gear train stage 42. The third gear train stage 43, which is the last gear train stage in this embodiment, may be housed in the second housing 47, which may be made of metal. As shown in FIGS. 6 and 7, five planetary gears 43*b* may engage the sun gear 43*a* of the third gear train stage 43. Each of the five planetary gears 43*b* of the third gear train stage 43 may be rotatably supported by a carrier 43*c* via corresponding shafts 43*e*. The five planetary gears 43*b* may engage an inner side of an internal gear 43*d* of the third gear train stage 43. The internal gear 43*d* of the third gear train stage 43 may be a ring gear.

As shown in FIG. 5, a circular ring-shaped interposing member 49 may be disposed between the internal gear 42*d* of the second gear train stage 42 and the internal gear 43*d* of the third gear train stage 43. Because of the presence of the interposing member 49, the internal gear 42*d* of the second gear train stage 42 and the internal gear 43*d* of the third gear train stage 43 may be prevented from being displaced in a direction along or parallel to the motor axis line J.

Referring to FIG. 5, the carrier 43*c* of the third gear train stage 43 may be rotatably supported by an inner surface of the second housing 47 via the bearing 27. The carrier 43*c* may be connected to the rotation shaft 21 of the wheel 22 via, for example, a spline shaft 21*a* of the rotation shaft 21. Because of this configuration, the wheel 22 may be integrally rotated with the carrier 43*c*. Accordingly, when the electric motor 31 is rotated, the carrier 43*c* may be rotated, for instance in a direction indicated by an arrow C in FIG. 6, thereby rotating the wheel 22, for instance in a direction indicated by an arrow R in FIG. 2. This causes the driver to move (return) in an upward direction.

As shown in FIGS. 6 and 7, the internal gear 43*d* of the third gear train stage 43 may be supported by the inner surface of the second housing 47. Four outer periphery projections 43*f* may extend outwardly from an outer peripheral surface of the internal gear 43 in a radial direction of the internal gear 43. Correspondingly, four inner periphery projections 47*a* may extend inwardly from an inner peripheral surface of the second housing 47 in a radial direction of the second housing 47.

As shown in FIGS. 6 and 7, an elastic member 50 may be disposed between each of the four outer periphery projections 43*f* and corresponding four inner periphery projections 47*f*. When the carrier 43*c* of the third gear train stage 43 is rotated, for instance in a direction indicated by an arrow C in FIG. 6, a force P (e.g., a counter force) may be applied to the internal gear 43*d* in an opposite direction, which may be a direction opposite to the direction indicated by the arrow C (in a direction indicated by an arrow L in FIG. 6). The force P may be received by the four elastic member 50. The force P may be an external force which corresponds to a gas pressure. The gas pressure applied to the driver 15 may be indirectly applied to the internal gear 43 of the third gear train stage 43 via the wheel 22. The force P may be intermittently applied to the internal gear 43 when the engaging portion 25 of the wheel 22 engages and/or disengages from the engaged portion 16 of the driver 15.

Each of the outer periphery projection 43*f* may include an elastic member receiving surface 43*g* that is configured to contact the elastic member 50. Each of the elastic member receiving surfaces 43*g* of the outer periphery projections 43*f* may extend in a direction approximately perpendicular to a tangential plane of an outer peripheral surface of the internal gear 43*d*. Because of this configuration, the elastic member 50 may be elastically deformed by the force P in an efficient manner.

Figure 8:
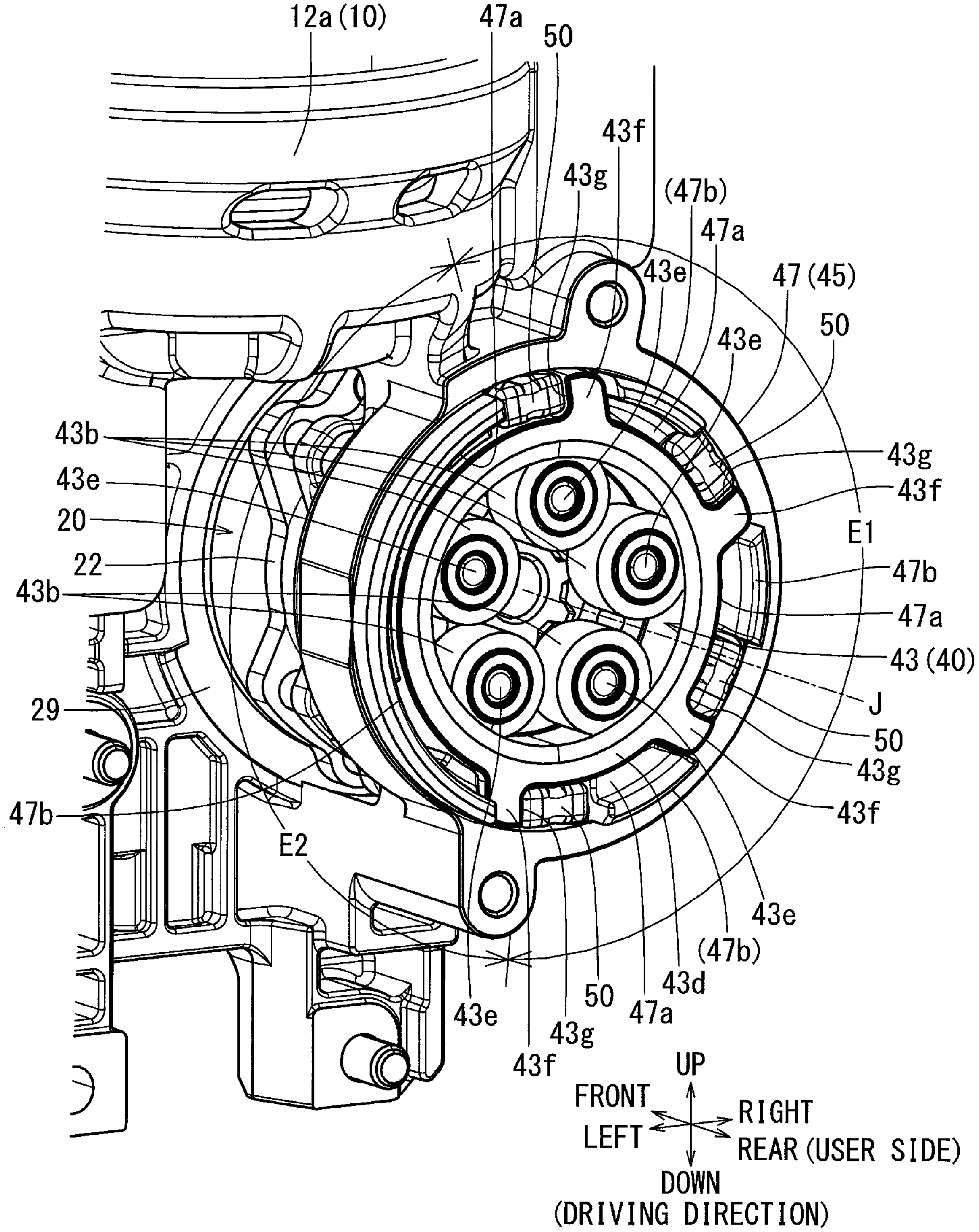
FIG. 8 is a perspective view showing a housed state of the third gear train stage with respect to a second housing.

As shown in FIGS. 5 and 8, a boss portion 47*b* for connecting the second housing 47 to the first housing 46 may be formed at a rear end portion of the second housing 47. The boss portion 47*b* may be formed in an annular shape that extends rearward along a rear end surface of the second housing 47. The boss portion 47*b* of the second housing 47 may be inserted into a front-side inner periphery surface of the first housing 46, thereby coaxially connecting the first housing 46 to the second housing 47.

As shown in FIGS. 6 and 8, the annular-shaped boss portion 47*b* may include four cut portions. Each of the four elastic members 50 may be housed in a corresponding one of the four cut portions. The elastic member 50 may be positioned along the same circumference. Because of this configuration, the second housing 47 may be made compact in a radial direction of the second housing 47, in comparison to a configuration in which a boss portion having a large diameter is continuously formed along an entire circumference on an outer periphery side of the elastic member 50. The four elastic member 50 may be arranged in an area E1 spanning approximately half of the annular-shaped boss portion 47*b*. The area E1 may be on a side of the boss portion 47*b* opposite to or facing away from the driver 15. By not arranging the elastic members 50 in the area E2 which may be on the same side of the boss portion 47*b* as the driver 15, the second housing 47 may be arranged close to the driver 15. Because of this configuration, the driving nose 2 may be made more compact.

Also, a thickness of the second housing 47 in the area E2 on the side of the driver 15 may be configured to be thicker than a thickness of the second housing 47 in the area E1 on the side opposite to the driver 15. Because of this configuration, the second housing 47 may be arranged close to the driver 15, thereby making the driving nose 2 more compact.

Figure 9:
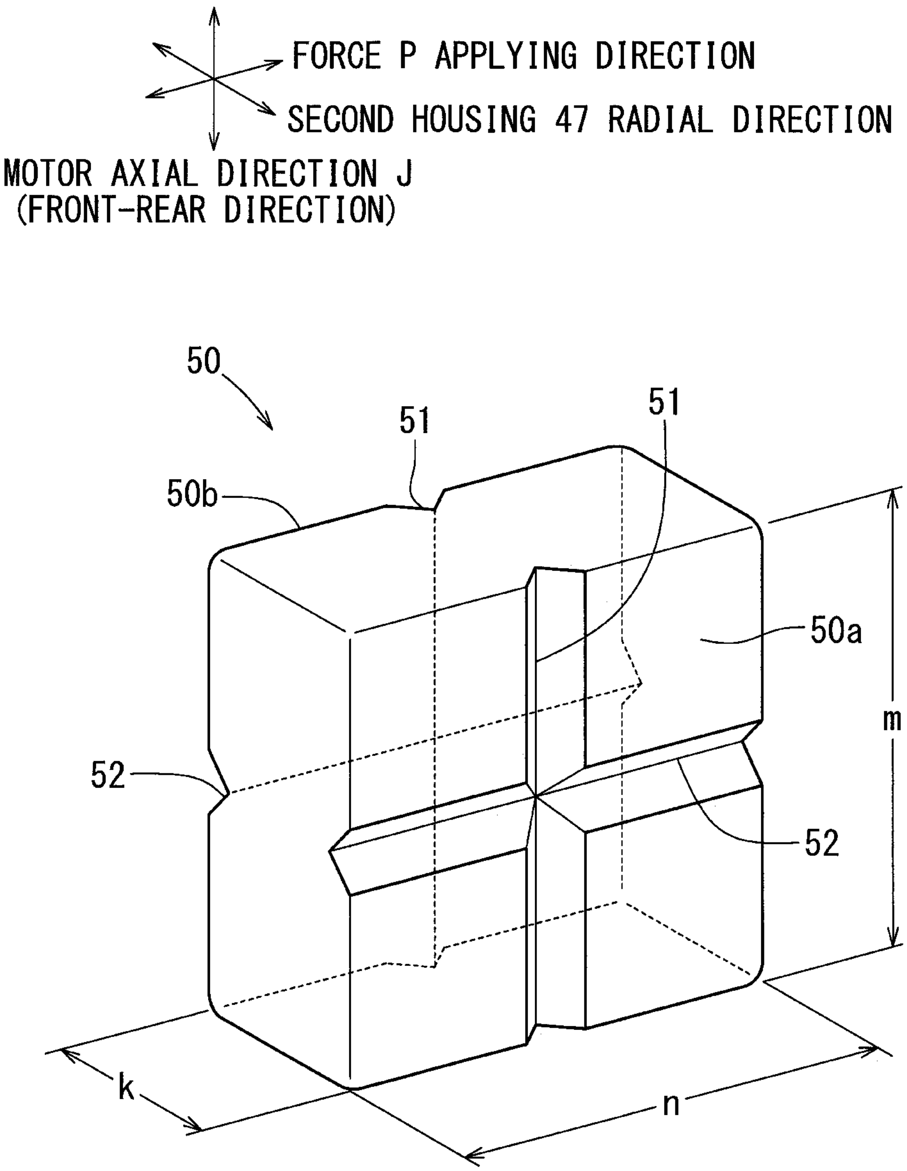
FIG. 9 is a perspective view of an elastic member.

FIG. 9 shows a single elastic member 50. In the first embodiment of the present disclosure, each elastic member 50 may be, for example, a rubber member having six plane faces. Each elastic member 50 may include an inner periphery side surface 50*a* and an outer periphery side surface 50*b*, each of which is disposed in a direction perpendicular to a radial direction of the second housing 47, as shown in FIGS. 7 and 8. Referring to FIG. 9, a vertical length m of the side surfaces 50*a*, 50*b* may be configured to be the same as a transversal length n of the side surfaces 50*a*, 50*b*. Furthermore, a vertical groove 51 and a transversal groove 52 may be formed on the side surfaces 50*a*, 50*b* such that the vertical groove 51 intersects with the transversal groove 52 to form a cross shape.

When the electric motor 31 is rotated, each elastic member 50 may receive the force P from a corresponding outer periphery projection 43*f*, which may, for example, cause a groove width of the vertical groove 51 to be narrowed. Because of this configuration, a thickness k of the elastic member 50 may be prevented from increasing (for instance increasing in a radial direction of the second housing 47). Accordingly, the force P may be efficiently absorbed by this elastic deformation of the elastic member 50, without the need for especially preparing a large space allowing an elastic deformation of the elastic member in its thickness direction. As a result, the second housing 47 may be made more compact in the radial direction of the second housing 47.

The elastic members 50 may each include two side surfaces 50*a*, 50*b* having the same vertical length m and transversal length n (m=n). Also, the two side surfaces 50*a*, 50*b* may each include the vertical groove 51 and the transversal groove 52 that intersect to each other to form a cross shape. Because of this configuration, referring to FIGS. 7 and 9, by reversing the elastic member 50 in a direction of the motor axis J, in a direction to which the force P is applied, or in a radial direction of the second housing 47, the elastic member 50 may be correctly inserted between the outer periphery projection 43*f* and the inner periphery projection 47*a*. Thus, assemble efficiency (assemblability) of the elastic member 50 may be improved.

As shown in FIG. 5, a washer 48 may be disposed between the second gear train stage 42 and the third gear train stage 43. The washer 48 may cover rear portions of the planetary gears 43*b* of the third gear train stage 43, a rear portion of the internal gear 43*d* of the third gear train stage 43, and rear portions of the four elastic members 50. Because of this configuration, the internal gear 43*d* and the elastic members 50 may be prevented from being displaced in a direction along the motor axis line J. In this manner, the elastic members 50 may be prevented from being displaced along or parallel to the direction of the motor axis J by use of the washer 48. The displacement of the planetary gears 43*b* and the internal gear 43*d* of the third gear train stage 43 may also be prevented. In other words, the displacement of the planetary gears 43*b*, the internal gear 43*d*, and the elastic members 50 may be prevented by use of the common member, i.e., the washer 48. Accordingly, the elastic members 50 may be prevented from being displaced in the direction along or parallel to the motor axis line J without complicating a configuration, such as, for example, using separate restriction members.

As discussed above, according to the first embodiment of the present disclosure, the four elastic members 50 may be arranged between the second housing 47 and the internal gear 43*d* of the planetary gear device 40. When the driver 15 moves upward, the force P applied by the internal gear 43*d* in a rotational direction (in a direction indicated by an arrow L in FIG. 6) may be received by the elastic members 50. Because of this configuration, the force P from the internal gear 43*d* may be absorbed by the elastic members 50, thereby improving the longevity of the second housing 47.

According to the first embodiment, since the elastic members 50 are arranged between the second housing 47 and the internal gear 43*d* of the planetary gear device 40, a length of the planetary gear device 40 as measured along its center axis line direction (in a direction of the motor axis line J) may be made smaller.

According to the first embodiment, each of the four elastic members 50 may be disposed between one of the four outer periphery projections 43*f* of the internal gear 43*d* and a corresponding one of the four inner periphery projections 47*a* of the second housing 47. The force P in the rotational direction (in a direction indicated by an arrow L in FIG. 6), which is applied to the second housing 47 via the internal gear 43*d*, may be reliably absorbed by the elastic members 50, thereby improving the longevity of the second housing 47.

According to the first embodiment, each of the outer periphery projections 43*f* of the internal gear 43*d* may include an elastic member receiving surface 43*g* that is configured to contact the elastic member 50. The elastic member receiving surfaces 43*g* of the outer periphery projection 43*f* may each extend in a direction approximately perpendicular to a tangential plane of an outer peripheral surface of the internal gear 43*d*. Because of this configuration, the force P acting around a center axis of the internal gear 43*d* may be applied to the elastic members 50 in an efficient manner. Accordingly, the force P may be efficiently absorbed by the elastic members 50. Also, the elastic members 50 may be prevented from being displaced and deformed in a radial direction of the second housing 47.

According to the first embodiment, the two side surfaces 50*a*, 50*b* of the elastic member 50 may each include the vertical groove 51 running along a direction of the motor axis line J and the transversal groove 52 running along a rotational direction around the motor axis line J. Because of this configuration, when the electric motor 31 is rotated (which may be when the driver 15 moves upward), the elastic members 50 may receive the force P from the internal gear 43*d*. This may cause the elastic members 50 to deform such that a groove width of the vertical groove 51 is narrowed. Because of this configuration, the elastic members 50 may be prevented from enlarging (increasing in size) in a radial direction of the second housing 47. Accordingly, the force P may be absorbed by the elastic members 50 in an efficient manner.

According to the first embodiment, the gear housing 45 may include a first housing 46 made of a resin and a second housing 47 made of metal, the first and second housings 46, 47 being connected to each other along or parallel to a center axis of the internal gear 43*d* (in a direction of the motor axis line J). The internal gear 43*d* of the third gear train stage 43, which is the last gear train stage, may be housed in the second housing 47. The force P, which is applied to the second housing 47, may be absorbed by the elastic members 50, thereby improving the longevity of the second housing 47.

According to the first embodiment, the second housing 47 may include a boss portion 47*b* that is inserted to an inner periphery surface of the first housing 46. The boss portion 47*b* may be used for connecting the second housing 47 to the first housing 46. The four elastic members 50 may be arranged along the same circumference (e.g., reference circle) as the boss portion 47*b*. Because of this configuration, the second housing 47 may be formed more compactly in the radial direction of the second housing 47. Also, the elastic members 50 may be efficiently arranged between the second housing 47 and the internal gear 43*d*.

According to the first embodiment, the driver 15 may reciprocate in an up-down direction, which is generally a direction perpendicular to a center axis line of the planetary gear device 40 (which may also correspond to the motor axis line J). The elastic member 50 may be arranged in an area E1 which is on a side of the center axis line of the planetary gear device 40 opposite to the driver 15. By not arranging the elastic members 50 in the area E2, which is on the same side of the center axis line of the planetary gear device 50 as the driver 15, a thickness of the second housing 47 in such area E2 may be decreased. Because of this configuration, the driving nose 2 may be made more compact in a radial direction of the second housing 47. Also, the force P may be absorbed by the elastic members 50 in the required area.

According to the first embodiment, a rear portion of the third gear train stage 43 may be covered by a single washer 48. The planetary gears 43*b*, the internal gear 43*d*, and the elastic members 50 may be prevented from being displaced along or parallel to a direction of the motor axis line J by use of the washer 48. Accordingly, the displacement of the elastic members 50 may be prevented without using a separate restriction member, thereby avoiding a complicated configuration.

The first embodiment of the present disclosure discussed above may be modified in various ways. In the above-exemplified embodiment, four elastic members 50 may be disposed between the internal gear 43*d* and the second housing 47. However, the number of elastic members 50 may be one or more than one.

In the above-exemplified embodiment, the planetary gear device 40 may include a first housing 46 made of a resin and a second housing 47 made of metal. However, the exemplified absorbing configuration may be adopted to an integral gear housing. Furthermore, the gear housing may be made of either resin or metal.

In the above-exemplified embodiment, the planetary gear device 40 may include a gear train with three planetary gear train stages, i.e., a first gear train stage 41, a second gear train stage 42, and a third gear train stage 43. However, the exemplified absorbing configuration may be adopted to a planetary gear device that includes a gear train with one planetary gear train stage, two planetary gear train stages, or more than three planetary gear train stages.

Furthermore, in the above-exemplified embodiment, the elastic members 50 may be disposed between the third gear train 43 and the gear housing 45. However, in addition to this, the elastic members 50 may be disposed between a gear train stage on an upstream side (on a side of the electric motor 31) and the gear housing 45, i.e., between the first gear train stage 41 and the gear housing 45, or between the second gear train stage 42 and the gear housing 45.

Figure 10:
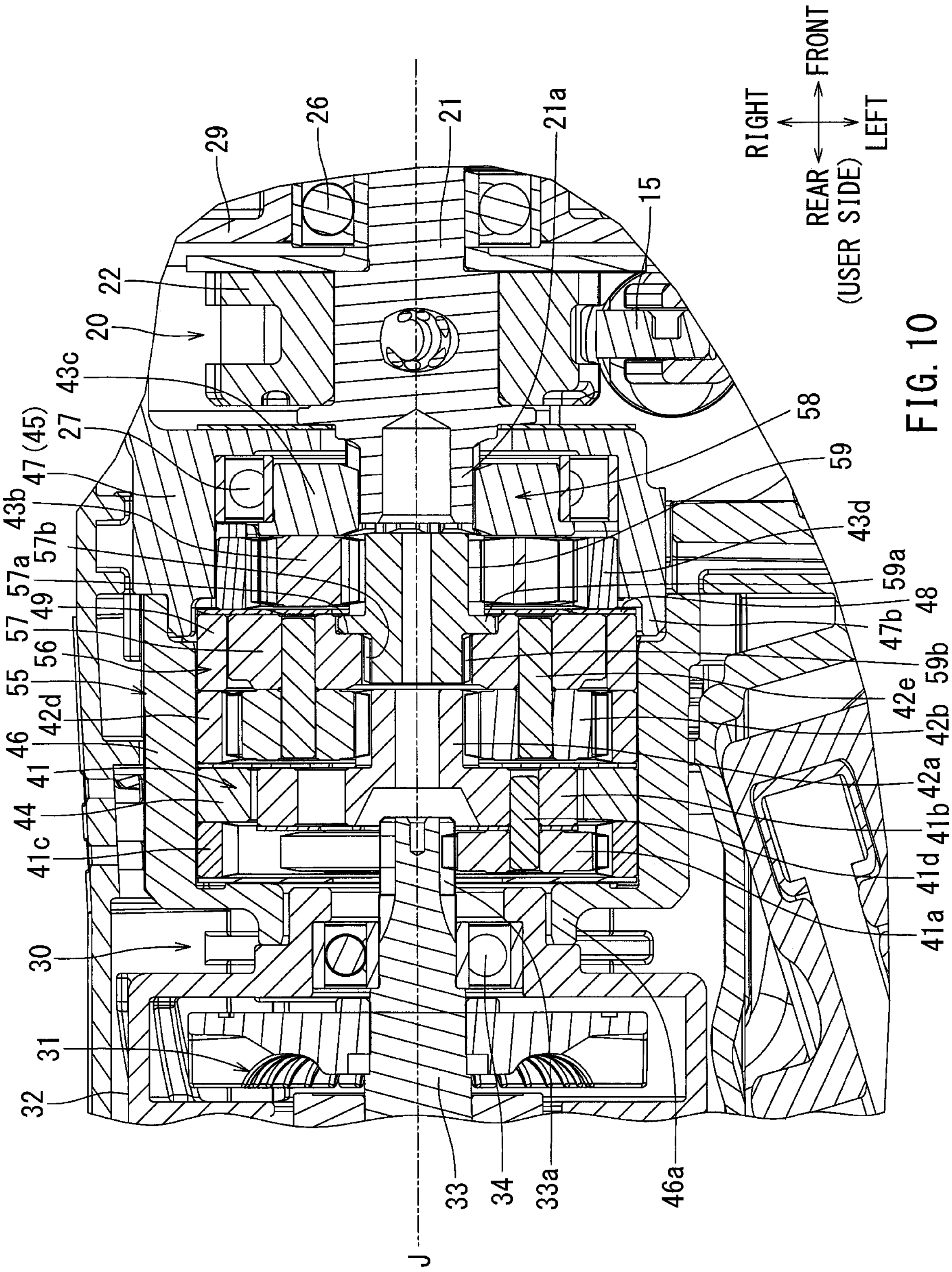
FIG. 10 is a transversal cross-sectional view of a planetary gear device according to a second embodiment of the present disclosure.

FIG. 10 shows a planetary gear device 55 according to the second embodiment of the present disclosure. The second embodiment may include a first gear train stage 41, a second gear train stage 56, and a third gear train stage 58 as seen from an upstream side of a power transmission path (as seen from a side of the electric motor 31). Similar to the first embodiment, elastic members 50 may be disposed between the gear housing 45 and the last gear train stage, which is the third gear train stage 58 in this embodiment. The planetary gear device 55 of the second embodiment may differ from the planetary gear device 40 of the first embodiment in that a carrier 57 of the second gear train stage 56 of the second embodiment, which precedes the last gear train stage, may be a separate member from a sun gear 59 of the third gear train 58. Descriptions of the members and configurations that do not need to be substantially modified and are in common with the first embodiment and corresponding descriptions thereof with regard to the second embodiments are omitted by use of the same reference numerals.

Figure 11:
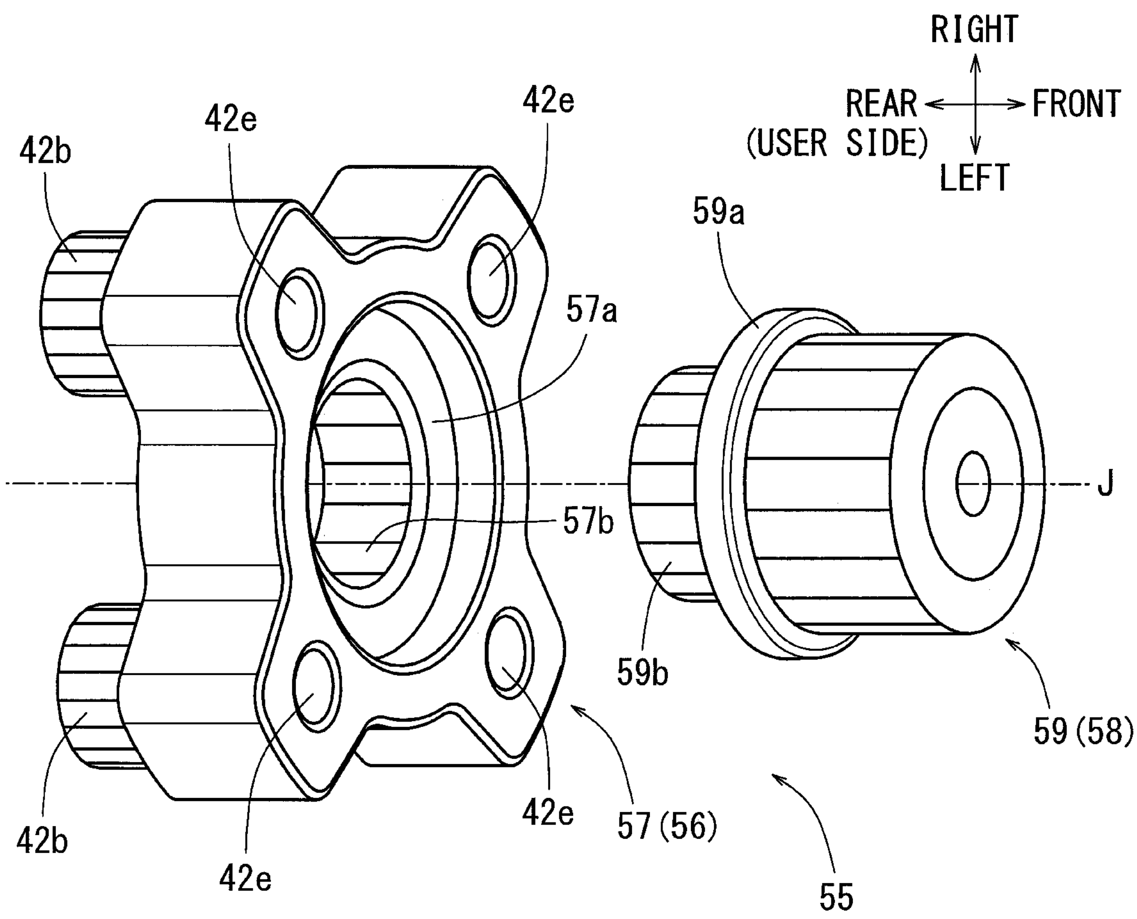
FIG. 11 is an exploded perspective view of a carrier of a second gear train stage and a sun gear of a third gear train stage according to the second embodiment.

As shown in FIG. 11, for example, four planetary gears 42*b* may be supported by a carrier 57 of the second gear train stage 56. Each of the four planetary gears 42*b* may be rotatably supported by the carrier 57 via a support shaft 42*e*. The four planetary gears 42*b* may all engage the sun gear 42*a*. The sun gear 42*a* may be integrally formed with the carrier 41*b* of the first gear train stage 41. The planetary gears 42*b* may all engage the internal gear 42*d* of the second gear train stage 42. The internal gear 42*d* may be fixed to the inner surface of the first housing 46, which may be made of a resin.

As shown in FIG. 11, a circular recess portion 57*a* may be formed in a front surface of the carrier 57. A coupling hole 57*b* may be formed at a center of the recess portion 57*a*. The coupling hole 57*b* may pass through the carrier 57 in a thickness direction of the carrier 57. The recess portion 57*a* and the coupling hole 57*b* may be configured to be coaxial with the motor axis line J. A spline may be formed in a surface the coupling hole 57*b*.

Referring to FIG. 11, a sun gear 59 of the third gear train stage 58 may be connected to a front surface of the carrier 57. As shown in FIG. 11, the sun gear 59 may include a flange portion 59*a*. A connection shaft 59*b* may be formed on a rear side of the flange portion 59*a*. The connection shaft 59*b* may be formed as a spline shaft. The connection shaft 59*b* may be configured to be coaxial with the sun gear 59. The connection shaft 59*b* may be inserted into the coupling hole 57*b* from the front, such that the carrier 57 and the sun gear 59 may form an involute spline. Because of this spline connection configuration, the carrier 57 and the sun gear 57 may be integrally rotated with each other around the motor axis line J.

The sun gear 59 may be prevented from being displaced rearward by the flange portion 59*a*, which is inserted into the recess portion 57*a* having a bottom surface. Furthermore, the sun gear 59 may be prevented from being displaced forward by the presence of a washer 48 that is disposed at a front surface of the flange portion 59*a*.

Similar to the first embodiment, the last stage planetary gears 43*b* may engage the sun gear 59 of the third gear train stage 58. The planetary gears 43*b* may be supported by the carrier 43*c*. The rotation shaft 21 may be spline-connected to a center of the carrier 43*c*. The last stage carrier 43*c* may be supported by an inner periphery surface of the second housing 47, which is made of metal, via the bearing 27.

According to the second embodiment, the sun gear 59 of the third gear train stage 58, which is the last stage gear train stage, may be a separate member from the carrier 57 of the second gear train stage 56, which is adjacent to the last gear train stage 58. The sun gear 59 and the carrier 57, which are separate members, may be spline-connected to each other, thereby causing the sun gear 59 and the carrier 57 to be in a loosely fitted state in a radial direction of the third gear train stage 58. Because of this configuration, a self-aligning function of the sun gear 59 with respect to the planetary gears 43*b* of the third gear train stage 58 may be obtained. Accordingly, a load on the third gear train stage 58 may be reduced owing to the self-aligning function of the sun gear 59, thereby increasing the longevity of the third gear train stage 58

Different from the above configuration, a spline-connected configuration may be utilized by the carrier 57 of the second gear train stage 56, which may have a spline shaft, and the sun gear 59 of the third gear train stage 58, which may have a spline hole.

In the above embodiment, the sun gear 59 of the third gear train stage 58, which is the last gear train stage, may be spline-connected to the carrier 57 of the second gear train stage 56, which is adjacent to the last gear train stage. However, instead of a spline connection, for example, a shaft portion formed in a hexagonal shape may be connected to a hole portion formed in a hexagonal shape. This allows for proper clearance between the two members (mainly in a radial direction of the third gear train stage 58), thereby obtaining a self-aligning function of the sun gear 59 with respect to the planetary gears 43*b*.

In the second embodiment, instead of the rotation shaft 21 having a spline shaft 21*a*, the rotation shaft 21 may be integrally formed with the carrier 43*c* of the third gear train stage 58.

Furthermore, in the second embodiment, in addition to, or instead of, a configuration in which the sun gear 59 of the third gear train stage 58 is spline-connected to the carrier 57 of the second gear train stage 56 (which results in a self-aligning function of the sun gear 59), the sun gear 42*a* of the second gear train stage 56 may be spline-connected to the carrier 41*b* of the first gear train stage 56 (thereby resulting in a self-aligning function of the sun gear 42*a* of the second gear train stage 56).

The driving tool 1 in the first and second embodiments may be one example of a driving tool according to one aspect or other aspects of the present disclosure. The piston 13 in the first and second embodiments may be one example of a piston according to one aspect or other aspects of the present disclosure. The driver 15 in the first and second embodiments may be one example of a driver according to one aspect or other aspects of the present disclosure. The driving member N in the first and second embodiments may be one example of a driving member according to one aspect or other aspects of the present disclosure. The wheel 22 in the first and second embodiments may be one example of a wheel according to one aspect or other aspects of the present disclosure. The electric motor 31 in the first and second embodiments may be one example of an electric motor according to one aspect or other aspects of the present disclosure.

The planetary gear device 40 in the first and second embodiments may be one example of a planetary gear device according to one aspect or other aspects of the present disclosure. The second housing 47 in the first and second embodiments may be one example of a second housing according to one aspect or other aspects of the present disclosure. The internal gear **43*d* in the first and second embodiments may be one example of an internal gear and/or a ring gear according to one aspect or other aspects of the present disclosure. The force P in the first and second embodiments may be one example of a force according to one aspect or other aspects of the present disclosure. The elastic member 50** in the first and second embodiments may be one example of an elastic member according to one aspect or other aspects of the present disclosure.

What is claimed is:

1. A driving tool, comprising:

a piston configured to move in a driving direction owing to a pressure of a gas;

a driver configured to drive a driving member by moving integrally with the piston in the driving direction;

a wheel configured to move the driver in a direction opposite to the driving direction;

an electric motor configured to rotate the wheel due to rotation of the electric motor, thereby moving the driver in the direction opposite the driving direction;

a planetary gear device configured to reduce a rotation output of the electric motor, thereby outputting a reduced rotation output to the wheel, the planetary gear device including a gear train with a plurality of gear train stages arranged in series;

a gear housing configured to house the planetary gear device; and an elastic member disposed between an internal gear of a last stage of the gear train stages of the planetary gear device and the gear housing, wherein:

the elastic member is configured to receive a force from the internal gear, the force being generated when the electric motor rotates;

the gear housing includes a first housing made of a resin and a second housing made of a metal, the first housing and the second housing being connected to each other in a direction parallel to a center axis of the internal gear; and the second housing houses the internal gear of the last stage of the gear train stages.

2. The driving tool according to claim 1, wherein:

the internal gear includes an outer periphery projection projecting radially outward from an outer peripheral surface of the internal gear;

the gear housing includes an inner periphery projection projecting radially inward from an inner peripheral surface of the gear housing; and the elastic member is disposed between the outer periphery projection and the inner periphery projection, such that the elastic member receives the force applied by the internal gear in a rotation direction via the outer periphery projection when the driver moves in the direction opposite to the driving direction.

3. The driving tool according to claim 2, wherein:

the outer periphery projection includes an elastic member receiving surface that is configured to be in contact with the elastic member, the elastic member receiving surface extending in a direction approximately perpendicular to a tangential plane of an outer peripheral surface of the internal gear.

4. The driving tool according to claim 1, wherein:

the elastic member is made of a rubber; and the elastic member includes a first groove on a surface of the elastic member.

5. The driving tool according to claim 4, wherein:

the elastic member has six plane faces;

the first groove of the elastic member is configured to extend in a direction parallel to a center axis of the internal gear; and the elastic member includes a second groove that is configured to extend in a direction perpendicular to the direction in which the first groove extends when the elastic member is disposed between the internal gear and the gear housing.

6. The driving tool according to claim 1, wherein:

the second housing includes a boss portion that is inserted into an inner periphery surface of the first housing for connecting the second housing to the first housing; and the elastic member is arranged on a same reference circle as the boss portion, an axis of the reference circle being on a center axis of the internal gear.

7. The driving tool according to claim 6, wherein the boss portion includes a cut portion, the elastic member being housed in the cut portion.

8. The driving tool according to claim 1, wherein:

the driver is configured to reciprocate in a direction perpendicular to a center axis of the internal gear when viewed in a direction perpendicular to the center axis of the internal gear; and the elastic member is disposed in an area of the internal gear on a side of the center axis of the internal gear opposite to a side nearer the driver.

9. The driving tool according to claim 1, further comprising:

a washer that is configured to cover the internal gear and the elastic member such that the internal gear and the elastic member are prevented from being displaced in a direction parallel to a center axis of the internal gear.

10. The driving tool according to claim 1, wherein:

the planetary gear device includes a gear train having a plurality of gear train stages arranged in series along a power transmission path;

each of the plurality of gear train stages include a sun gear, a plurality of planetary gears each of which engages the sun gear, and a carrier that rotatably supports each of the plurality of planetary gears;

the sun gear of the gear train stage on a downstream side of the power transmission path is arranged at a position of the carrier of the gear train stage, except a last gear train stage of the plurality of gear train stages, on an upstream side of the power transmission path; and the carrier of the gear train stage on the upstream side is connected to the sun gear of the gear train stage on the downstream side so as to be relatively movable, the carrier and the sun gear being formed of separate members.

11. The driving tool according to claim 10, wherein:

the sun gear and the carrier, which are separate members, are spline-connected to each other.

12. The driving tool according to claim 10, wherein the planetary gear device includes a gear train having three gear train stages.

13. The driving tool according to claim 1, further comprising a wheel case configured to house the wheel, the wheel case not directly overlapping the elastic member in a direction parallel to the driving direction.

14. The driving tool according to claim 13, wherein:

the gear housing includes a first housing and a second housing, the first housing and the second housing being connected to each other in a direction parallel to a center axis of the internal gear;

the second housing of the gear housing and the wheel case housing the wheel are integrally formed; and a portion of an integrally formed unit comprising the second housing of the gear housing directly overlaps the elastic member in the direction parallel to the driving direction.

15. The driving tool according to claim 1, wherein:
the wheel further comprises a rotation shaft about which the wheel rotates; and
the elastic member does not directly overlap the rotation shaft of the wheel in a direction parallel to the driving direction.

16. The driving tool according to claim 1, wherein the elastic member directly overlaps the internal gear in a direction parallel to the driving direction.

17. The driving tool according to claim 1, wherein a reference circle centered around a center axis of the internal gear passes through both the internal gear and the elastic member.

18. The driving tool according to claim 1, wherein the internal gear is a ring gear of the planetary gear device.

19. A driving tool, comprising:
a piston configured to move in a driving direction owing to a pressure of a gas;
a driver configured to drive a driving member by moving integrally with the piston in the driving direction;
a wheel configured to move the driver in a direction opposite to the driving direction;
an electric motor configured to rotate the wheel due to rotation of the electric motor, thereby moving the driver in the direction opposite the driving direction;
a planetary gear device configured to reduce a rotation output of the electric motor, thereby outputting a reduced rotation output to the wheel, the planetary gear device including a gear train with a plurality of gear train stages arranged in series;
a gear housing configured to house the planetary gear device; and
an elastic member disposed inside the gear housing between the gear housing and an internal gear of a last stage of the gear train stages of the planetary gear device that is housed in the gear housing, wherein:
the elastic member is configured to receive a force from the internal gear, the force being generated when the electric motor rotates.

20. The driving tool according to claim 19, wherein:
the gear housing includes a first housing and a second housing; and
the second housing houses the internal gear of the last stage of the gear train stages.

* * * * *